United States Patent [19]
Reeder et al.

[11] Patent Number: 5,980,667
[45] Date of Patent: Nov. 9, 1999

[54] WINDOW, MUNTIN AND METHOD

[75] Inventors: Steven L. Reeder; Michael A. Reeder, both of Salisbury, N.C.

[73] Assignee: Custom Glass Products of Carolina, Inc., Salisburg, N.C.

[21] Appl. No.: 08/957,498

[22] Filed: Oct. 24, 1997

[51] Int. Cl.[6] ................................................ E06B 3/673
[52] U.S. Cl. .................. 156/109; 156/108; 156/278; 427/163.1; 427/168; 427/195; 427/372.2; 427/385.5; 427/393.5; 52/786.13
[58] Field of Search ............................. 156/99, 278, 107, 156/109, 108; 427/195, 163.1, 168, 372.2, 384, 385.5, 388.4, 393.5; 52/171.3, 172, 746.1, 786.13

[56] References Cited

U.S. PATENT DOCUMENTS 4,348,435  9/1982  Mistrick et al. ........................... 428/34

OTHER PUBLICATIONS

*Fenestration* magazine Jul./Aug. 1997, Ashlee Pub. Co. 182 41st Street, New York, NY 10017.

*Primary Examiner*—Francis J. Lorin

[57] ABSTRACT

A non-metal window muntin formed from plastic or wood is described for use in hermetically sealed insulated glass windows. The process for forming the muntin includes machining polystyrene sheets which are painted with a latex paint and baked prior to use between sealed glass of the window.

13 Claims, 3 Drawing Sheets

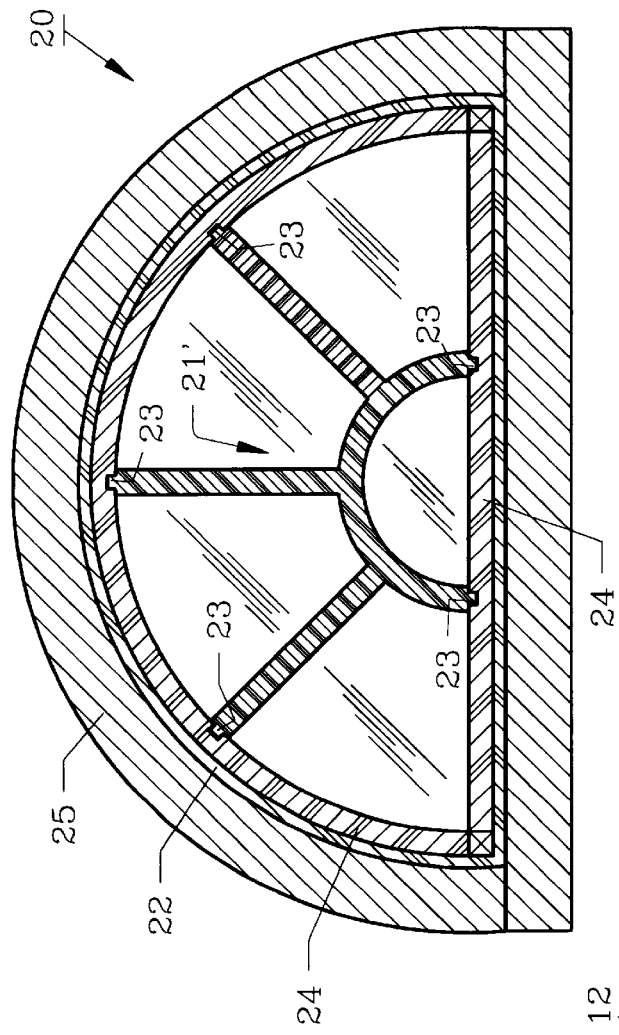
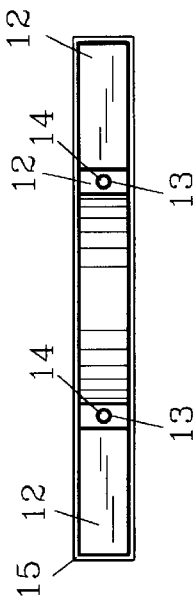
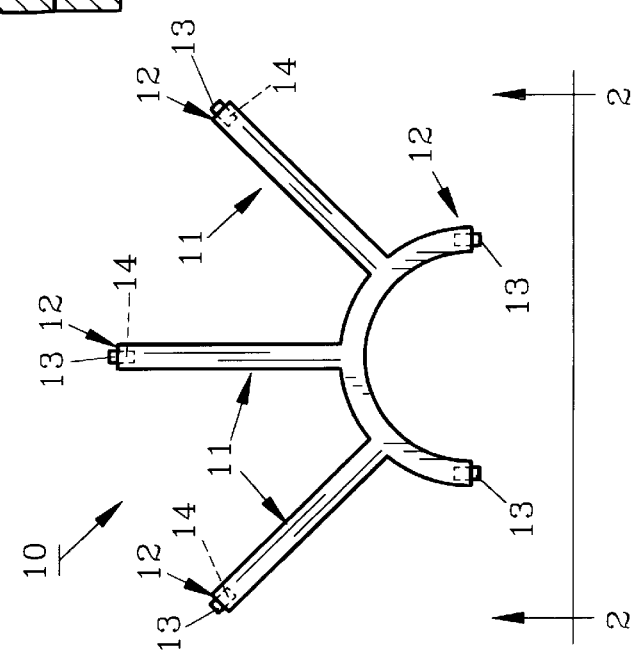
FIG. 4
FIG. 2
FIG. 1

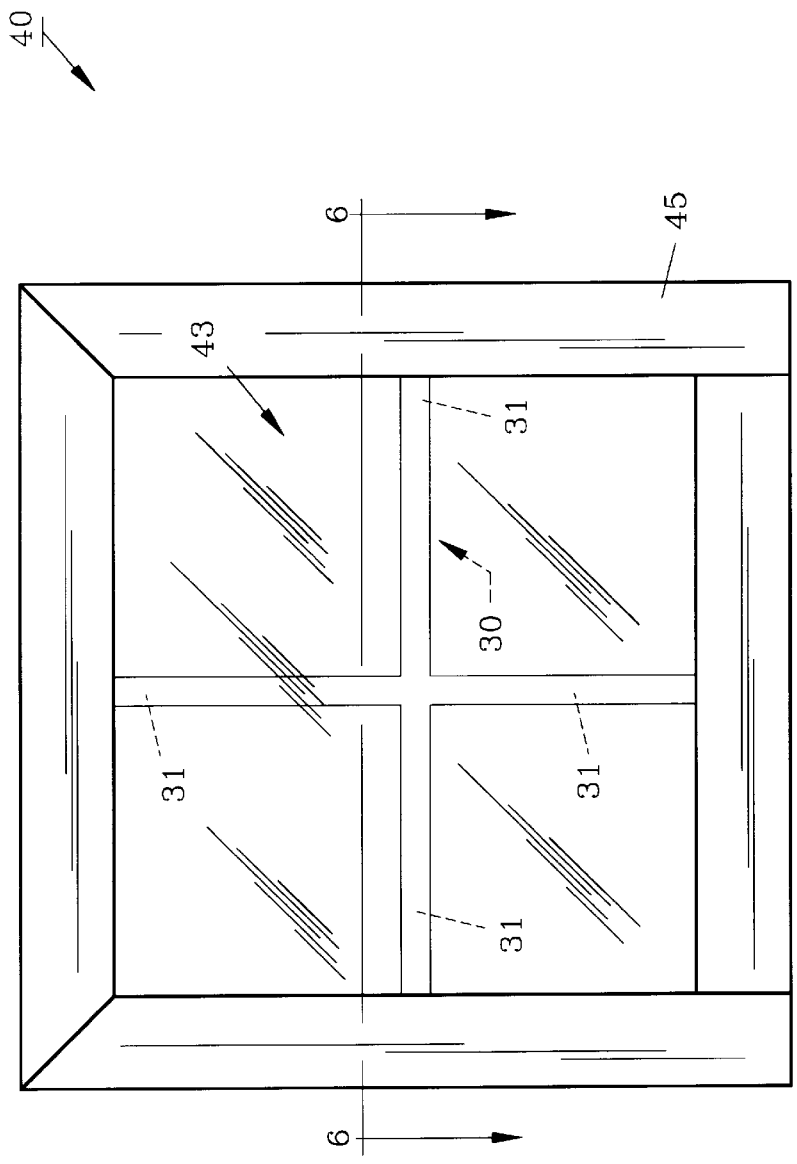
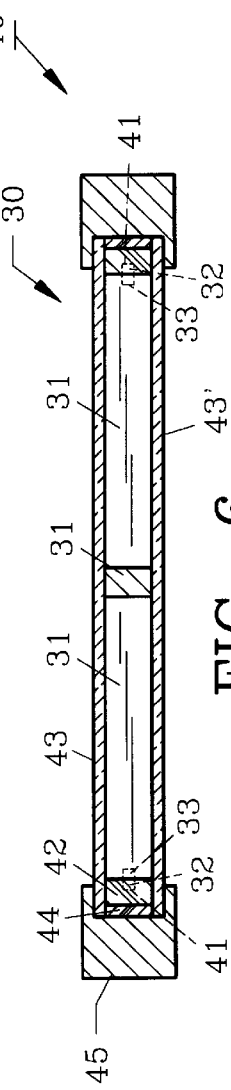
FIG. 5
FIG. 6

WINDOW, MUNTIN AND METHOD

BACKGROUND OF THE INVENTION

1. Field of the Invention

This invention pertains to a decorative window muntin contained between two hermetically sealed panes of glass and a method for making the same.

2. Description of the Prior Art and Objectives of the Invention

In recent years, glass making and installing has progressed to allow large panes of window glass to be installed, whereas, previously, small panes were individually framed and supported within a window structure known by those in the industry as true divided lite (TDL). This TDL arrangement became unnecessary with utilization of large panes. For example, whereas, previously, a one meter by one meter window glass may have been made of nine individual panes of glass, now one pane is used.

While the science of glass and window making was advancing to allow larger panes of glass to be used, similar advances occurred in energy efficient windows, and hermetically sealed insulated glass windows have become increasingly popular. Such windows have parallel spaced panes of glass to provide insulation and increase energy conservation. These windows are commonly referred to as having insulated glass (IG) as two normal panes of glass are combined to form one pane of IG.

In an effort to make the appearance of the new IG windows match older windows, decorative muntins formed from metal are placed between the panes of glass in IG. These muntins do not provide any support; they are purely decorative. In this manner the IG windows look like TDL windows while providing the insulative properties desired by today's window owners and fabricators.

Problems sometimes arise in IG windows as strong sunlight or heated temperatures raise the temperature inside the sealed glass. Moisture in the muntin vaporizes and often recondenses on the inside surface of the glass pane, causing a fog-like effect which "clouds" the glass. Because the glass is sealed, cleaning or rubbing will not remove this clouding. The escape of moisture or liquid from the muntin is commonly referred to as "outgassing" and has been the cause of much dissatisfaction in the window fabrication and installation industry. Likewise, this problem has required the replacement of many IG windows which become opaque with moisture.

While outgassing is less of a problem with conventional aluminum muntins, another problem arises in the manufacture of aluminum muntins for use in IG windows. Aluminum can be difficult to bend using present technology, and some shapes are just not possible to create using aluminum. This is important in oddly shaped windows. Where aluminum can be used, it is frequently a multipiece assembly which raises manufacturing and assembly costs.

Other problems arise in the expansion and contraction of conventional muntins as they undergo temperature changes in installed windows. Some muntins expand too rapidly when heated and buckle within the IG. At other times when the expanded muntin attempts to contract, the warp or buckle has become permanent and is unsightly.

Therefore with these and other problems known, it is an objective of the present invention to provide a muntin for use in an IG window which does not cause or allow outgassing.

It is a further objective of the present invention to provide a muntin within an IG window which is pleasing to the consumer's eye.

It is still a further objective of the present invention to provide a muntin which is easy to manufacture through the use of Computer Aided Design (CAD) tools.

It is another objective to provide a muntin with low expansion characteristics and which has high memory.

It is yet another objective to provide an abrasive resistant muntin which is inexpensive to manufacture.

It is still a further objective to provide a one piece muntin that is ready to be placed within a window without additional assembly steps.

It is yet a further objective to provide a method of making a muntin with the above described characteristics.

Various other objectives and advantages of the invention will become readily apparent to those skilled in the art upon further reference to the detailed description below.

SUMMARY OF THE INVENTION

The aforesaid and other objectives are realized by a window muntin machined from a non-metal material, preferably polystyrene, although polyurethane or wood may be acceptable, which is easily machined using CAD technology. The machined muntin is painted with a latex paint and baked until the moisture is removed and the paint has dried. The baked muntin is then placed between two panes of glass and hermetically sealed therein as is usual in the art. This glass unit is then available for mounting in a conventional window assembly.

BRIEF DESCRIPTION OF THE DRAWINGS

FIG. 1 shows a front elevational view of the preferred embodiment of the decorative muntin of the invention;

FIG. 2 illustrates a bottom plan view of the muntin along lines 2—2 of FIG. 1;

FIG. 4 features a cross-sectional view of the window of FIG. 3;

FIG. 5 depicts an alternate embodiment of a muntin in a pane of insulated glass mounted in a window; and FIG. 6 shows a cross-sectional view of the window of FIG. 5 along lines 6—6.

DETAILED DESCRIPTION OF THE PREFERRED EMBODIMENTS AND OPERATION OF THE INVENTION

Figure 3:
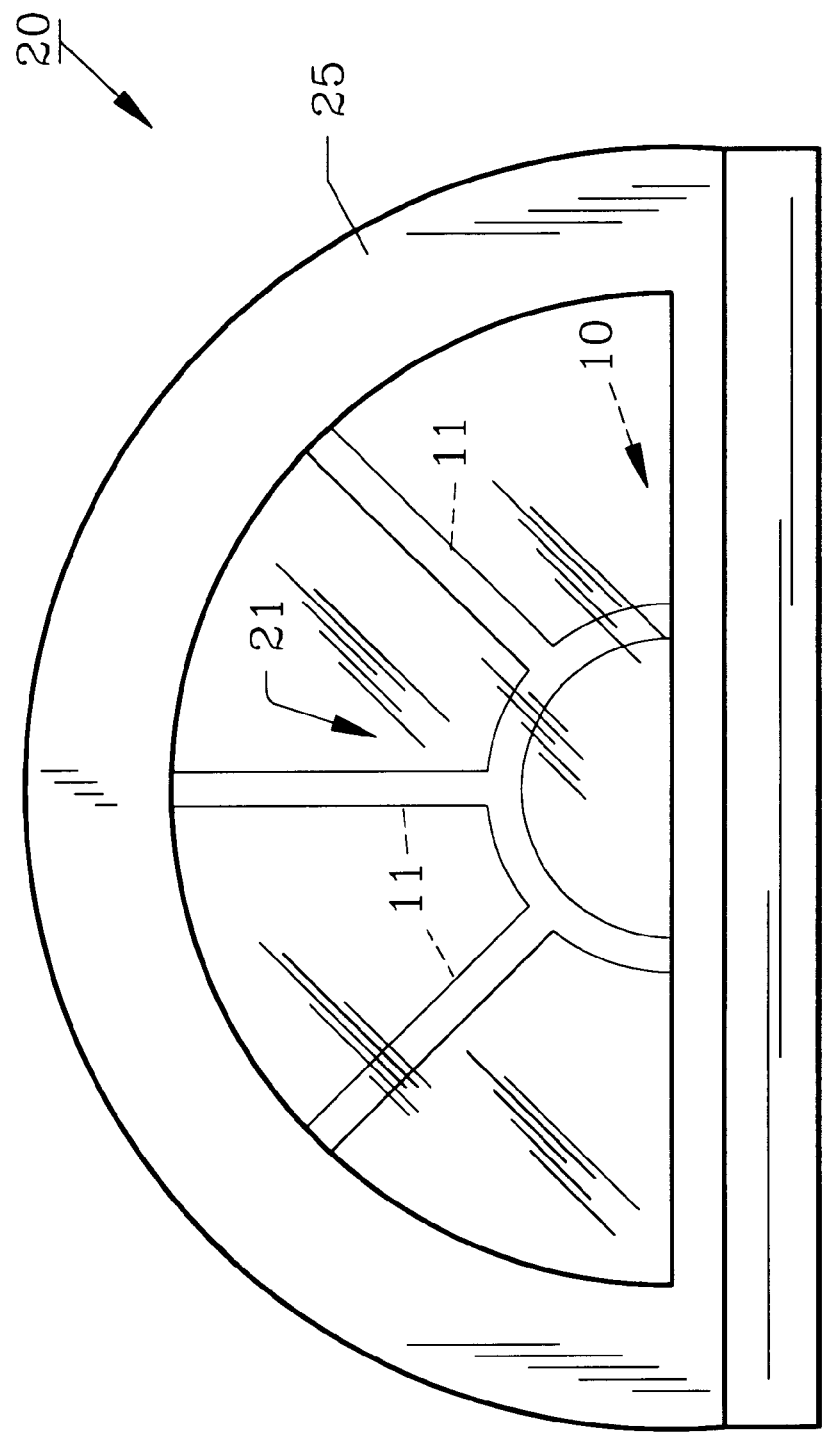
FIG. 3 demonstrates a front elevational view of the muntin of FIG. 1 mounted between panes of glass in an IG window.

Turning now to the drawings, specifically FIGS. 1 and 2 show decorative window muntin 10, the preferred embodiment. Non-metal window muntin 10 is preferably machined from a 0.476 cm thick sheet of polystyrene, although other polymeric or non-metal materials such as polyurethane or wood may be acceptable, into a desired shape such as the radial display seen in FIG. 1, although other shapes and designs can be employed. Window muntin 10 includes a plurality of arms 11, each including end 12. Placed into each end 12 is cylindrical pin 13, which is preferably formed from aluminum 0.238 cm in diameter and 1.27 cm long. Pins 13 are received by cylindrical channels 14 which are preferably 0.238 cm in diameter and 0.635 cm deep, so that approximately one-half the length of each pin 13 extends from each channel 14. Pin 13 is centrally located on end 12 for optimum stability. Paint layer 15 (FIG. 2) completely surrounds and coats window muntin 10. Paint layer 15 is preferably conventional pigmented latex paint. It is within the scope of the present invention to use conventional clear or unpigmented sealants such as a polyurethane or other varnishes in place of paint 15.

After window muntin 10 is painted and heat cured as explained in the preferred method below, it is ready to be placed in insulated window 20 as seen in FIGS. 3 and 4. Insulated window 20 comprises two parallel, opposing conventional glass plies 21 and 21' disposed in conventional wooden or aluminum window frame 25. Glass plies 21 and 21' are spaced one from the other by conventional sealant 22, such as a two part polyurethane finish which hermetically seals plies 21 and 21' together. Spacer 24, formed from rolled aluminum preferably from 1.27 cm to 1.905 cm thick hold plies 21 and 21' apart and is placed inside, but flush against sealant 22, and includes a number of cylindrical channels 23 equal to the number of pins 13 on muntin 10 and spaced around spacer 24 according to the location of pins 13 on muntin 10. Channels 23 are, preferably, 0.238 cm in diameter and 0.635 cm deep to accommodate pins 13 as best seen in FIG. 4. As can be easily understood, pins 13 hold muntin 10 in the proper position when placed and secured in channels 23 and 14. Spacer 24 and muntin 10 are sandwiched between glass plies 21 and 21' as sealant 22 hermetically seals muntin 10 therein as is conventional and well understood in the art.

Window muntin 30, an alternate embodiment, is shown in FIGS. 5 and 6. Muntin 30 includes arms 31 with pins 32 much like muntin 10. Pins 32 fit into channels 33 of arms 31 and channels 41 of spacer 42. Glass plies 43 and 43' sandwich muntin 30 therebetween and are sealed with sealant 44. Frame 45 surrounds and obscures sealant 44 and spacer 42 from normal vision. Likewise, pins 32 are hidden from normal vision by muntin 30. It is to be understood, that while not shown, muntin 30 also has a layer of paint surrounding and sealing muntin 30 to prevent outgassing.

While only two embodiments of the present invention are shown, it is to be understood that any number of configurations or geometrically shaped windows, and muntins sized to fit such windows are possible and within the scope of the present invention. While glass is the preferred transparent ply, other plies such as polyacrylic, polycarbonates or the like may be used. The spacer would be resized and the channels in the spacer rod would be repositioned to accommodate the pins. Likewise, there is no particular muntin cross section preferred. A simple rectangle is shown in FIG. 2, but other conventional shapes are contemplated.

In the preferred method of making decorative window muntin 10, a cross section is chosen such as rectangular cross-section seen in FIG. 2. The dimensions of this cross-section are programmed into a conventional CAD program that can be downloaded into a three to five axis CNC router (not shown) such as those sold by CR Onsrud Inc. of Huntersvile, N.C. A planar sheet of high impact polystyrene, preferably 0.476 cm thick and of a size large enough to accommodate the desired pattern or configuration is placed on a cutting table (not shown) and secured. The cutting unit on the router is then engaged and the desired pattern is cut, so that an unfinished, but machined muntin 10 is created.

Using a conventional electric drill (not shown) with a 0.238 cm diameter drill bit, channels 23 are drilled 0.635 cm deep into the center of ends 12 of muntin 10. Pins 13 are inserted and secured in ends 12 with a conventional adhesive. Muntin 10 is cleaned using a conventional solvent such as an ethyl or other alcohol solution to remove any dust or oils from the cutting procedures. Muntin 10 is then coated with a conventional water-based latex paint such that layer of paint 15 is formed thereon. This is preferably done in a conventional spray booth. All sides of muntin 10 should be so coated with a light to medium coat of paint and allowed to completely air dry.

After drying, muntin 10 is then preferably heat cured or baked at 220° F. or 104.4° C. for twenty to thirty minutes so as to force the gases contained within muntin 10 to be driven out or be sealed therewithin. By this procedure, only an extremely low percentage of volatiles remains which can later cause outgassing. Muntin 10 is then placed between two plies of glass 21 and 21' as earlier described and is hermetically sealed or sandwiched between plies of glass 21 and 21' for use in a conventional window, such as window 20.

The preceding recitation is provided as an example of the preferred embodiment and an alternate embodiment for illustrative purposes and is not meant to limit the nature or scope of the present appended claims. Variations of the invention are anticipated by those skilled in the art.

We claim:

1. A method for forming a decorative window muntin, said method comprising the steps of:
   a) cutting a polymeric material into a desired muntin configuration;
   b) coating the polymeric material; and
   c) heating the polymeric material.

2. The method as claimed in claim 1 wherein cutting a polymeric material into a desired configuration comprises the step of cutting a sheet of polystyrene.

3. The method as claimed in claim 1 wherein coating the polymeric material comprises spray painting the polymeric material with a latex paint.

4. The method as claimed in claim 1 further comprising the step of placing the polymeric material between two panes of glass.

5. The method as claimed in claim 1 further comprising the step of hermetically sealing the two panes of glass.

6. A method for making a decorative window muntin, said method comprising the steps of:
   a) cutting a polymeric material into a desired muntin configuration;
   b) cleaning the cut polymeric material;
   c) coating the cleaned polymeric material; and
   d) baking the polymeric material.

7. The method as claimed in claim 6 wherein cutting a polymeric material into a desired configuration comprises the step of cutting a planar sheet of polystyrene.

8. The method as claimed in claim 6 wherein cleaning the cut polymeric material comprises the step of wiping the cut polymeric material with alcohol.

9. The method as claimed in claim 6 wherein coating the cleaned polymeric material comprises spraying the polymeric material with a latex paint.

10. The method as claimed in claim 6 further comprising the step of placing the polymeric material between two panes of glass.

11. The method as claimed in claim 10 further comprising the step of hermetically sealing the two panes of glass.

12. The method as claimed in claim 6 further comprising the step of placing a pin the cut polymeric material.

13. The method as claimed in claim 12 wherein placing a pin comprises the step of placing an aluminum pin.

* * * * *

UNITED STATES PATENT AND TRADEMARK OFFICE
CERTIFICATE OF CORRECTION

PATENT NO. : 5,980,667
DATED : November 9, 1999
INVENTOR(S) : Reeder, et. al.

It is certified that error appears in the above-identified patent and that said Letters Patent is hereby corrected as shown below:

Column 4, line 38, delete "1" and insert --4--.

Signed and Sealed this

Twenty-second Day of August, 2000

Attest:

Q. TODD DICKINSON

*Attesting Officer*     *Director of Patents and Trademarks*

(12) EX PARTE REEXAMINATION CERTIFICATE (6719th)
United States Patent
Reeder et al.

(10) Number: US 5,980,667 C1
(45) Certificate Issued: Mar. 24, 2009

(54) WINDOW, MUNTIN AND METHOD

(75) Inventors: Steven L. Reeder, Salisbury, NC (US); Michael A. Reeder, Salisbury, NC (US)

(73) Assignee: Custom Glass Products of Carolina, Inc., Salisbury, NC (US)

Reexamination Request:
No. 90/006,802, Oct. 8, 2003

Reexamination Certificate for:
Patent No.: 5,980,667
Issued: Nov. 9, 1999
Appl. No.: 08/957,498
Filed: Oct. 24, 1997

Certificate of Correction issued Aug. 22, 2000.

(51) Int. Cl.
*E06B 1/00* (2006.01)
*E06B 3/66* (2006.01)

(52) U.S. Cl. .................. 156/109; 156/108; 156/278; 427/163.1; 427/168; 427/195; 427/372.2; 427/385.5; 427/393.5; 52/786.13

(58) Field of Classification Search .................. None
See application file for complete search history.

(56) References Cited

U.S. PATENT DOCUMENTS

| | | | |
|---|---|---|---|
| 3,308,593 A | 3/1967 | Smith | |
| 3,358,412 A | 12/1967 | Martin | 52/456 |
| 3,411,258 A | 11/1968 | Kessler | 52/456 |
| 3,716,164 A | 2/1973 | Fennema | |
| 3,946,531 A | 3/1976 | Armstrong | |
| 4,204,015 A * | 5/1980 | Wardlaw et al. | 428/34 |
| 4,222,210 A | 9/1980 | Hanstein et al. | |
| 4,305,982 A | 12/1981 | Hirsch | |
| 4,348,435 A | 9/1982 | Mistrick et al. | |
| 4,358,490 A | 11/1982 | Nagai | |
| 4,430,836 A | 2/1984 | McKann | |
| 4,437,284 A | 3/1984 | Cribben et al. | 52/456 |
| 4,475,311 A | 10/1984 | Gibson | 49/176 |
| 4,563,846 A | 1/1986 | Webb | |
| 4,686,121 A * | 8/1987 | Rogalla | 427/378 |
| 4,783,938 A | 11/1988 | Palmer | |
| 4,791,010 A | 12/1988 | Hanley et al. | |
| 4,989,384 A | 2/1991 | Kinghorn et al. | |
| 5,048,252 A | 9/1991 | Osborn | 52/456 |
| 5,088,307 A | 2/1992 | Cole | |
| 5,099,626 A | 3/1992 | Seeger | |
| 5,131,199 A | 7/1992 | Clark | |
| 5,274,976 A | 1/1994 | Burkhart | 52/456 |
| 5,315,797 A | 5/1994 | Glover et al. | 52/171.3 |
| 5,345,743 A | 9/1994 | Baier | 52/455 |
| 5,410,841 A | 5/1995 | Harris et al. | |
| 5,440,847 A | 8/1995 | Butler | |
| 5,456,048 A | 10/1995 | White | |
| 5,465,539 A | 11/1995 | Rose | 52/204.53 |
| 5,494,715 A | 2/1996 | Glover | |
| 5,555,989 A | 9/1996 | Moran, Jr. | 220/62 |
| D374,485 S | 10/1996 | Brown | |
| 5,630,306 A | 5/1997 | Wylie | 52/786.13 |
| 5,657,590 A * | 8/1997 | Digman et al. | 52/204.61 |
| 5,674,565 A | 10/1997 | Kausch et al. | 427/258 |
| 5,860,346 A * | 1/1999 | McKeegan et al. | 83/471.3 |
| 5,899,033 A | 5/1999 | Merchlewitz | |
| 5,980,667 A | 11/1999 | Reeder et al. | 156/109 |
| 6,035,597 A * | 3/2000 | Donaldson | 52/456 |
| 6,165,565 A * | 12/2000 | Schelhorn et al. | 427/536 |
| 6,311,455 B1 | 11/2001 | Gerard | |
| 6,415,579 B1 | 7/2002 | Reeder et al. | |
| 7,318,301 B2 | 1/2008 | Reeder et al. | |

FOREIGN PATENT DOCUMENTS

| | | |
|---|---|---|
| CA | 349611 | 4/1935 |
| CA | 793040 | 8/1968 |

OTHER PUBLICATIONS

Plastics Finishing and Decoration, Copyright 1986, Van Nostrand Reinhold Company Inc., ISBN: 0-442-28062-9, Chapter 8, pp. 130-145; Chapter 31, pp. 477-485.

(Continued)

*Primary Examiner*—Stephen J Stein

(57) ABSTRACT

A non-metal window muntin formed from plastic or wood is described for use in hermetically sealed insulated glass windows. The process for forming the muntin includes machining polystyrene sheets which are painted with a latex paint and baked prior to use between sealed glass of the window.

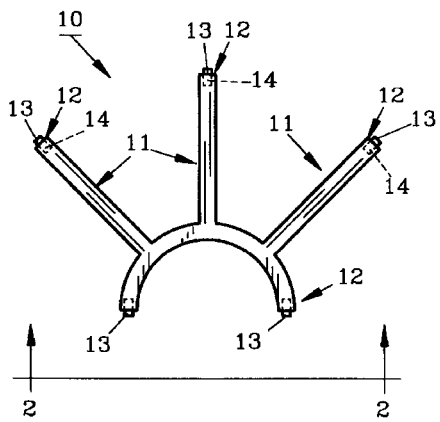

OTHER PUBLICATIONS

Plastics: Surface and Finish, $2^{nd}$ Edition, Copyright 1993, Royal Society of Chemistry, ISBN: 0–85186–209–8, Chapter 12, pp. 210–221.

Green Home Remodel, Health Homes for a Healthy Environment, King County Department of Natural Resources and Parks, Aug. 2005.

*Fenestratiion* magazine Jul./Aug. 1997, Ashlee Pub. Co. 182 $41^{st}$ Street, New York, NY 10017.

Order Granting Reexamination Dated Dec. 24, 2003 in application '818.

Office Action in Ex Parte Reexamination Dated Feb. 18, 2005 in application '818.

Bower, John, "Windows", "Green Alternatives", Nov./Dec. 1992, p. 26.

"Paint and Powder Curing", Product Finishing Magazine, Aug. 1993, pp. 76–84.

Schrantz, Joe, "IR Ovens Go with the Gold", "Industrial Paint and Powder", Nov. 1993, pp. 25–26.

Triplett, Tim, "The Cure for the Common Coating", "Industrial Paint & Powder", Sep. 1995, pp. 18–20.

Bailey, Jane M., "Plastics Painting Makes a Splash at Polaris", "Industrial Paint & Powder", Jul. 1996, pp. 14–16.

Bailey, Jane M., "Waterbone Wows Wood Finishers", "Industrial Paint & Powder", Oct. 1996, pp. 18–21.

Bailey, Jane M., "Painting Plastic Wheel Covers", "Industrial Paint & Powder", Nov. 1996, pp. 16–19.

Stoye, Dieter, "Paints, Coatings and Solvents", 1993, pp. 213–215.

Kent, Dr. Gary, "Prepaint Treatment of Plastics", Products Finishing Magazine, Aug. 1993, pp. 58–65.

* cited by examiner

US 5,980,667 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 4, 5 and 6 are determined to be patentable as amended.

Claims 2, 3 and 7–13, dependent on an amended claim, are determined to be patentable.

New claims 14–23 are added and determined to be patentable.

1. A method for forming a decorative window muntin, said method comprising the steps of:
   a) cutting a polymeric material into a [desired] *unitary one-piece* muntin configuration, *said muntin configuration comprising a curvilinear portion*;
   b) coating the polymeric material *on all sides of the polymeric material to keep vapors caused by heating from escaping the polymeric material*; and
   c) heating the polymeric material.

4. The method as claimed in claim 1 further comprising the step of placing the polymeric material between [two panes of glass] *a first pane of glass and a second pane of glass*.

5. The method as claimed in claim 4 further comprising the step of hermetically sealing the [two panes] *first pane of glass with the second pane* of glass.

6. A method for making a decorative window muntin, said method comprising the steps of:
   a) cutting a polymeric material into a [desired] *unitary one-piece* muntin configuration *having a curvilinear portion with at least three protrusions radially extending from said curvilinear portion*;
   b) cleaning the cut polymeric material;
   c) coating the cleaned polymeric material; and
   d) [baking] *heating* the polymeric material *to a temperature sufficient to vaporize the volatile forming compounds*.

*14. A method for forming a decorative window muntin, said method comprising the steps of:*
   *cutting a polymeric material into a desired muntin configuration, said muntin configuration consisting essentially of:*
   *a curvilinear portion; and*
   *protrusions extending from said curvilinear portion;*
   *coating the polymeric material on all sides to keep vapors caused by heating from escaping the polymeric material; and*
   *heating the polymeric material to a temperature sufficient to vaporize the volatile forming compounds.*

*15. A method for forming a decorative muntin configuration, said method comprising the steps of:*
   *cutting a curvilinear portion from a substantially polymeric material;*
   *cutting a substantially straight portion from the substantially polymeric material, said substantially straight portion extending radially from said curvilinear portion;*
   *coating the substantially polymeric material on all sides to keep vapors caused by heating from escaping the polymeric material; and*
   *heating the susbtantially polymeric material.*

*16. A method for forming a muntin configuration, said method comprising the steps of:*
   *cutting a single piece of polymeric material into a shape, said shape consisting of:*
   *a curved portion; and*
   *substantially straight portions radially protruding from said curved portion;*
   *coating the polymeric material on all sides; and*
   *heating the polymeric material.*

*17. A method for forming a muntin configuration, said method comprising the steps of:*
   *cutting a single piece of polymeric material into a muntin configuration, said configuration consisting of:*
   *at least one curved portion; and*
   *at least three substantially straight portions radially protruding from said at least one curved portion;*
   *cleaning the cut polymeric material;*
   *coating the cleaned polymeric material with paint on all sides to keep vapors caused by heating from escaping the polymeric material; and*
   *heating the polymeric material.*

*18. A method for forming a muntin configuration, said method comprising the steps of:*
   *cutting a curvilinear portion from a planar sheet of polystyrene;*
   *cutting substantially straight portions from the planar sheet of polysterene, the straight portions extending radially from the curvilinear portion;*
   *cleaning the cut polystyrene;*
   *coating the cleaned polystyrene with paint on all sides to keep vapors caused by heating from escaping the polystyrene; and*
   *heating the polystyrene.*

*19. A method for forming a muntin configuration, said method comprising the steps of:*
   *cutting a polymeric material into a desired configuration, said configuration being selected from the group consisting of:*
   *a semi-circular portion having at least three protrusions radially extending from the semi-circular portion;*
   *at least three arms being cut from a single piece of polystyrene material; and*
   *a curvilinear portion having protrusions radially extending there from;*
   *coating the polymeric material on all sides to keep vapors caused by heating from escaping the polymeric material; and*
   *heating the polymeric material.*

*20. A method for forming a decorative window muntin configuration, said method comprising the steps of:*
   *cutting a one-piece polymeric material into a shape, said shape consisting of:* at least one semi-circular portion; and at least three protrusions radially extending from the at least one semi-circular portion;

coating the polymeric material on all sides to keep vapors caused by heating from escaping the polymeric material; and heating the polymeric material.

21. A method for forming a muntin configuration, said method comprising the steps of:

cutting a piece of polymeric material into a shape having a non-linear portion;

coating the polymeric material on all sides; and heating the polymeric material.

22. A method for forming a muntin configuration, said method comprising the steps of:

cutting a piece of polymeric material into a non-linear shape having at least three terminal ends;

coating the polymeric material on all sides; and heating the polymeric material.

23. A method for forming a muntin configuration, said method comprising the steps of:

cutting a piece of polymeric material into a desired shape having a curved portion;

coating the polymeric material on all sides; and heating the polymeric material.

* * * * *